United States Patent [19]

Lipschitz

[11] Patent Number: 5,143,384
[45] Date of Patent: Sep. 1, 1992

[54] BI-DIRECTIONAL, NON-CONTACT FACE SEAL

[75] Inventor: Abraham Lipschitz, Warwick, R.I.

[73] Assignee: EG&G Sealol, Inc., Providence, R.I.

[21] Appl. No.: 337,828

[22] Filed: Apr. 14, 1989

[51] Int. Cl.$^5$ ............................................. F16J 15/16
[52] U.S. Cl. .................................. 277/96.1; 277/27; 277/81 S
[58] Field of Search ................ 277/96.1, 27, 81 S, 277/192

[56] References Cited

U.S. PATENT DOCUMENTS

| | | | |
|---|---|---|---|
| 2,921,806 | 1/1960 | Carter | 277/81 S |
| 3,068,801 | 12/1962 | Murray . | |
| 3,244,425 | 4/1966 | Wilkinson | 277/192 |
| 3,410,565 | 11/1968 | Williams . | |
| 3,495,841 | 2/1970 | Lindeboom . | |
| 3,511,510 | 5/1970 | Lindeboom . | |
| 3,640,541 | 2/1972 | Tashenberg . | |
| 3,675,935 | 7/1972 | Ludwig et al. . | |
| 3,744,805 | 7/1973 | Heinrich | 277/96.1 |
| 3,751,045 | 8/1973 | Lindeboom | 277/96.1 |
| 4,082,296 | 4/1978 | Stein | 277/3 |
| 4,212,475 | 7/1980 | Sedy | 277/96.1 |
| 4,389,052 | 6/1983 | Shimuzu et al. . | |
| 4,407,512 | 10/1983 | Trytek | 277/96.1 |
| 4,421,321 | 12/1983 | Lipschitz . | |
| 4,511,149 | 4/1989 | Wiese . | |
| 4,523,764 | 6/1985 | Albers et al. . | |
| 4,529,209 | 7/1985 | Nii et al. . | |
| 4,799,693 | 1/1989 | Johnson | 277/96.1 |

FOREIGN PATENT DOCUMENTS

| | | |
|---|---|---|
| 1155004 | 10/1983 | Canada . |
| 298324 | 1/1989 | European Pat. Off. . |
| 1964150 | 7/1970 | Fed. Rep. of Germany . |
| 0917693 | 2/1963 | United Kingdom .............. 277/81 S |
| 0920892 | 3/1963 | United Kingdom .............. 277/96.1 |

OTHER PUBLICATIONS

Lipschitz et al., "A Bi-Directional Gas Thrust Bearing", May 1990.
Gardner, "Recent Developments on Non-Contacting Face Seals," Lubrication Engineering, vol. 29, Sep. 1973, pp. 406-412.
Cheng et al., "Behavior of Hydrostatic and Hydrodynamic Noncontacting Face Seals," Transactions of the ASME, Apr. 1968, pp. 510-519.
Gabriel, "Fundamentals of Spiral Groove Noncontacting Face Seals," Lubrication Engineering, vol. 35, pp. 367-375, 4/78.
World Pumps, No. 10, Oct. 1985.

Primary Examiner—William A. Cuchlinski, Jr.
Assistant Examiner—Dan DePumpo
Attorney, Agent, or Firm—Finnegan, Henderson, Farabow, Garrett & Dunner

[57] ABSTRACT

A bi-directional seal for sealing, from the ambient, a pressurized fluid in the interior of a housing fitted with a rotatable shaft. The seal is a non-contact seal which balances hydrostatic and hydrodynamic forces to form a predetermined proper gap between the annular sealing faces of the rotor and the stator. The hydrodynamic forces are primarily a result of the size and configuration of the radial grooves formed in the sealing faces of either the rotor or the stator.

27 Claims, 4 Drawing Sheets

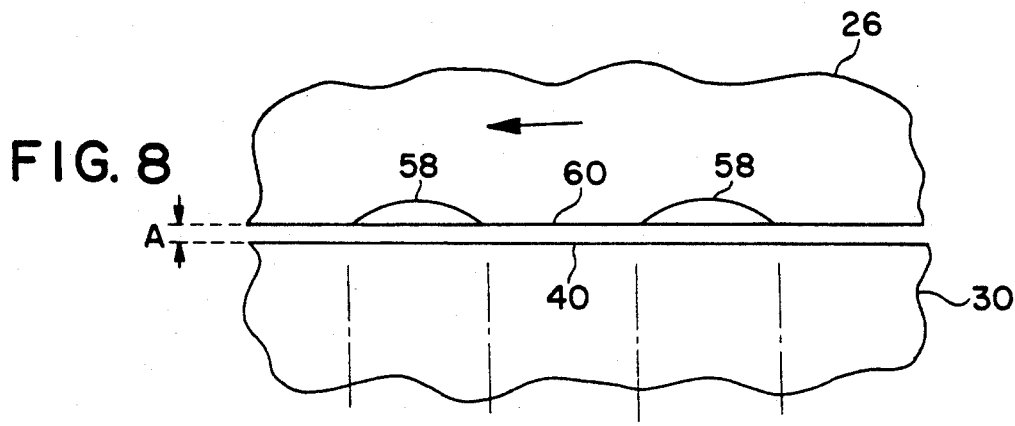
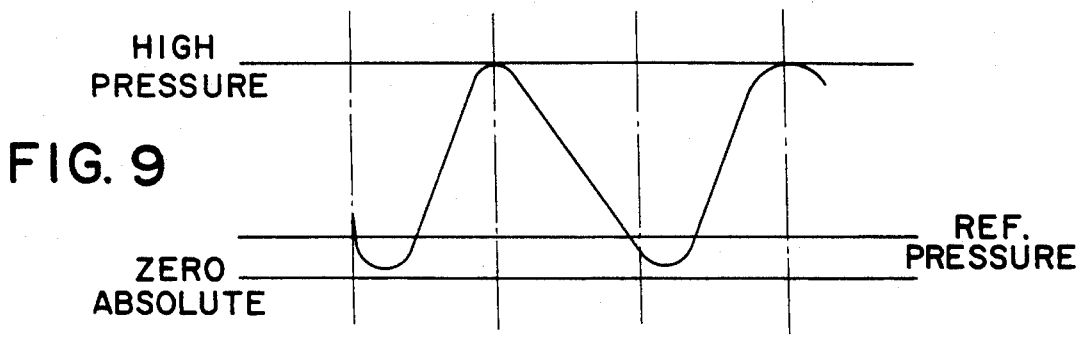
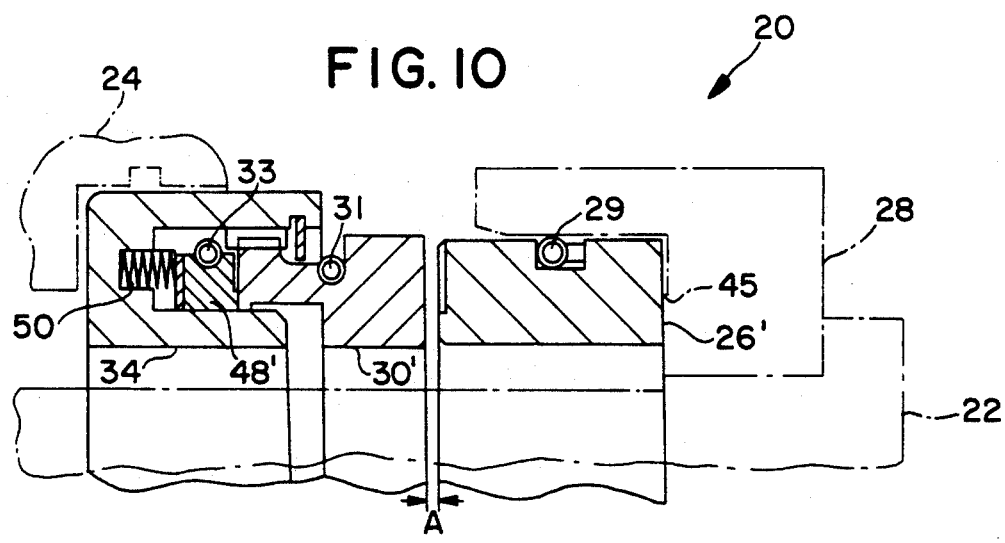

ly by means of the elements and combinations particularly pointed out in the appended claims.

BI-DIRECTIONAL, NON-CONTACT FACE SEAL

BACKGROUND OF THE INVENTION

1. Field of the Invention

The present invention relates to a bi-directional, non-contact face seal for sealing, from the ambient, a pressurized fluid in the interior of a housing fitted with a rotatable shaft.

2. Description of the Prior Art

The majority of seals used on rotating shafts in pressurized environments are contact seals which include a rotor fixed to the shaft and a stator fixed to the housing. In these traditional seals, when the shaft rotates, the rotor and the stator physically contact and slide relative to one another. As a result, abrasion occurs between the faces of the rotor and the stator. Such contact seals, therefore, require lubrication on or between the rubbing faces of the rotor and stator, particularly when subjected to high pressures and excessive speeds. If the sealed pressurized fluid has good lubrication qualities, the use of a contact seal structure is acceptable. However, contact seals exhibit undesirable wear characteristics and leakage, when used to seal fluids, such as air and steam, which do not have good lubrication characteristics.

In order to overcome the above difficulties, some efforts have been made to produce non-contact seals having a gap formed between the rotor and the stator to thereby eliminate rubbing. Such non-contact seals, however, represent a small percentage of conventional seals. Further, the state-of-the-art conventional non-contact seals have limited application and value. Conventional non-contact seals generally utilize spiral type grooves in the face of the rotor. An example of such seal is described in U.S. Pat. No. 4,212,475 to Sedy entitled Self Aligning Spiral Groove Face Seal. These non-contact seals are designed to function in a unidirectional manner. If the seals are driven in the opposite direction, they will not separate but will be pulled or sucked toward each other, thereby increasing wear and ultimately destroying the seal. For these reasons, the non-contact seals employing spiral grooves have significant limitations.

SUMMARY OF THE INVENTION

It is an object of the present invention to overcome the problems and disadvantages of the prior art seals by providing a bi-directional, non-contact face seal which seals, from the ambient, a pressurized fluid in the interior of the housing fitted with a rotatable shaft, regardless of what direction the shaft rotates.

Another object is to provide a seal which offers the necessary characteristics for high performance and general purpose containment of gases and liquids of poor lubrication characteristics, such as freon, air and hot water.

Yet another object is to provide a bi-directional, non-contact face seal which allows for extremely good control over leakage while maintaining the frictional power consumption at negligible levels.

Still another object is to provide a bi-directional, non-contact face seal which includes a rotor and stator which are split into two segments for easy around-the-shaft replacement.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a bi-directional seal for sealing, from the ambient, a pressurized fluid in the interior of a housing fitted with a rotatable shaft, the seal comprising a rotor fixed and sealed against the shaft for rotation with the shaft, said rotor including a first annular sealing face substantially perpendicular to the shaft; a stator axially slidably held relative to the housing for movement toward and away from the rotor, the stator including a second annular sealing face substantially perpendicular to the shaft; the first and second annular sealing faces being aligned with and opposed to each other, a variable gap between said faces providing a channel for the pressurized fluid to flow toward the ambient; means for preventing the rotation of the stator relative to the housing; sealing means for substantially preventing the flow of pressurized fluid to the ambient in areas other than across the sealing faces; means for biasing the stator and its second annular sealing face toward the rotor and its first annular sealing face; and gap positioning means for producing a gap dependent variable force to cause the gap between the first and second annular sealing faces to stay within a preselected range regardless of the directional rotation of the rotor, thereby providing a bi-directional non-contact seal.

In the preferred embodiment, the gap positioning means includes a plurality of radial grooves formed in one of the first and second sealing faces and positioned for fluid communication with the pressurized fluid. Preferably, the radial grooves extend inwardly from the outer periphery of the sealing face in which they are formed a radial distance less than the radial span of the respective sealing face. The remaining portion of the sealing face provides a sealing dam radially downstream to the radial grooves. The plurality of radial grooves are spaced from one another so that a plurality of lands separate the plurality of radial grooves. Preferably, the ratio of the distance between the ungrooved sealing faces over the distance between the bottom of the radial grooves and the opposite sealing face is within the range of 0.1 to 0.3.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description serve to explain the principles of the invention.

BRIEF DESCRIPTION OF THE DRAWINGS

FIG. 8 is a top view illustrating the relative sliding faces between the rotor and stator.

FIG. 9 is a circumferential pressure diagram illustrating the hydrodynamic pressure effects created between the rotating rotor and stator of the present invention, when the rotor spins to the direction indicated.

FIG. 10 is a partial cross-sectional view similar to that shown in FIG. 1 illustrating a second embodiment of the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
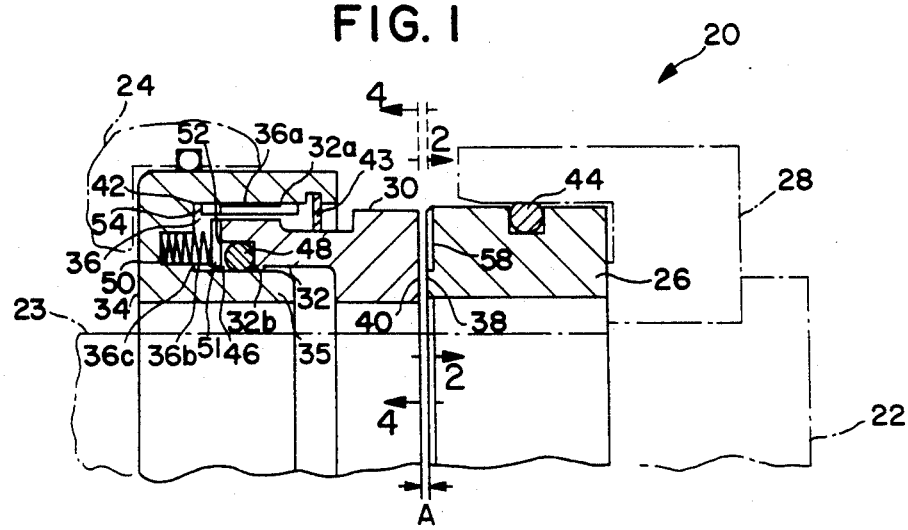
FIG. 1 is a cross-sectional view of the first embodiment of the bi-directional, non-contact seal of the present invention.

In accordance with the invention, a bi-directional seal for sealing, from the ambient, a pressurized fluid in the interior of a housing fitted with a rotatable shaft is provided. As shown in FIG. 1, the bi-directional, non-contact seal 20 of the present invention serves to provide a seal between a high pressure environment located at one side of a rotating shaft 22 and a low pressure or ambient environment located at the other side of shaft 22. The high pressure environment, shown in FIG. 1, is enclosed within a machine housing 24 and located to the exterior of shaft 22 and seal 20. An ambient pressure environment is located to the left of the machine housing 24 and along the outside diameter 23 of shaft 22 proximate seal 20.

In accordance with the invention, a rotor is fixed and sealed against the shaft for rotation with the shaft, and the rotor includes a first annular sealing face substantially perpendicular to the shaft. As embodied herein, seal 20 includes a circumferential rotor 26 having a sealing face 38. The rotor 26 is fixed to machine shaft 22 by a rotor carrier 28.

In accordance with invention, a stator is axially slidably held relative to the housing for movement toward and away from the rotor, and the stator includes a second annular sealing face substantially perpendicular to the shaft. As embodied herein, stator 30 includes a rear portion 32 having top and bottom surfaces, 32a and 32b, respectively, and a sealing face 40 located opposite of the rear portion 32. Stator 30 is housed within a U-shaped cup 34 affixed and sealed against housing 24 by conventional means. Cup 34 forms an elongated cup recess 36 having top, bottom and rear walls 36a, 36b and 36c, respectively, into which the rear portion 32 of stator 30 is slidably received for axial movement in response to force imparted thereon. Top surface 32a can slide along top wall 36a and bottom surface 32b can ride along the bottom wall 36b of cup recess 36. A recess 46 may be formed along bottom surface 32b of rear portion 32. As a result, bottom surface 32b may be shorter in length than top surface 32a of stator 30.

In the preferred embodiment of the present invention, cup 34 is made from metal, stator 30 is made of a carbon/graphite seal ring, and rotor 26 is made of a hard wear resistant material such as silicon carbide.

Figure 2:
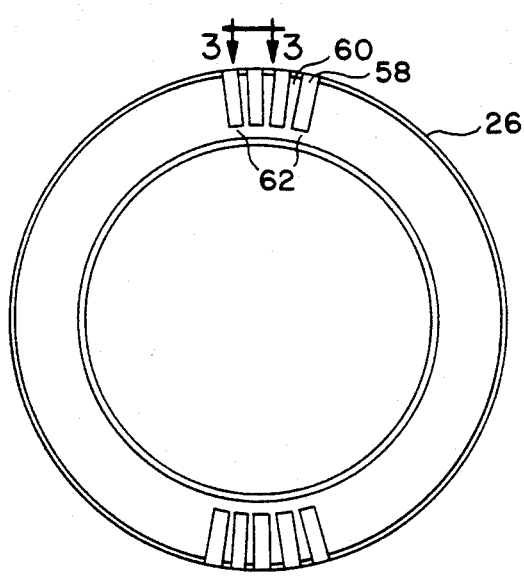
FIG. 2 is a frontal view taken along the lines 2—2 shown in FIG. 1 and illustrates the sealing face of the rotor of the present invention.
Figure 4:
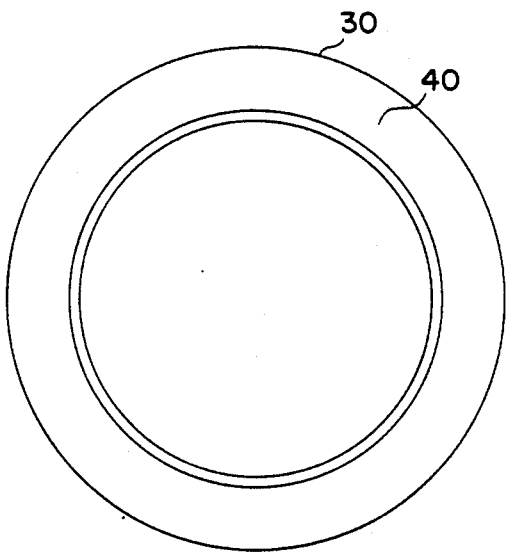
FIG. 4 is a frontal view taken along the lines 4—4 shown in FIG. 1 and illustrates the sealing face of the stator.
Figure 3:
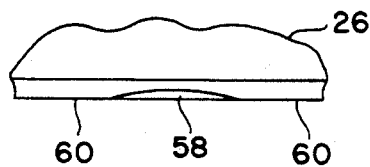
FIG. 3 is a top view taken along the lines 3—3 illustrating the cross-sectional view of the radial grooves formed in the rotor of the present invention.

In accordance with the invention, the first and second sealing faces are aligned with and opposed to each other a predetermined operating distance defining a gap, the gap providing a channel for the pressurized fluid to flow toward the ambient. As shown in FIGS. 1 and 10, rotor 26 and stator 30 are aligned with and opposed to each other so that an operating distance referred to as gap A is located at their interface. As shown in FIG. 2, at the interface area, rotor 26 includes a circumferential rotor sealing face 38 which is substantially perpendicular to the axis of shaft 22. Similarly, as shown in FIG. 4, at the interface area stator 30 includes an annular stator sealing face 40.

In accordance with the invention, means are provided for preventing the rotation of the stator relative to the housing. Preferably, the stator rotation prevention means includes an anti-rotational lug 42 that may be attached to or made integral with cup 34. Lug 42 cooperates with one or more slots formed in stator 30 to prevent stator 30 from rotating relative to cup 34 which is sealed against and rigidly mounted in housing 24. Further, retainer 43 can be provided to secure the positioning of stator 30 and prevent dislodging of such under the influence of spring 50.

In accordance with the invention, sealing means is provided for substantially preventing the flow of pressurized fluid to ambient through any channel except any gap between the first and second sealing faces. As embodied herein, static seal 44 is fit within an annular groove formed in the outer circumference of rotor 26 and fits snugly against the inner wall of rotor carrier 28. Preferably, static seal 44 is in the form of an elastomeric O-ring acting as a seal to prevent or minimize leakage along the exterior surface of rotor 26. The rotation of shaft 22 causes the joint rotation of the following elements: shaft 22, rotor carrier-28, rotor 26, and static seal 44.

Further, as shown in FIG. 1, the sealing means may include secondary seal 48 formed between the bottom surface 32b of stator 30 and cup 34. Secondary seal 48 forms a seal between stator 30 and cup 34. Preferably, secondary seal 48 is formed of an elastomeric O-ring. As shown in FIG. 1, secondary seal 48 can fit within recess 46 formed at the bottom surface 32b of stator 30. Secondary seal 48 is held in place by a securing means that is biased by spring 50 against the rear pressure face 52 of rear portion 32.

In accordance with the invention, means is provided for biasing the stator and its second annular sealing face toward the rotor and its first annular sealing face. As embodied herein, the biasing means includes spring 50, rear pressure face 52 of the stator, and fluid channel 54.

When the housing is not pressurized, the spring presses the stator toward the rotor. As the housing is pressurized, a hydrostatic force is imparted upon the rear pressure face 52. That force biases the stator toward the rotor. The variables factored into the resultant hydrostatic force include among other things the size of the rear pressure face 52 and the fluid channel 54. The stator can be designed to be subjected to a given hydrostatic force for a given preselected operating pressure. The net of hydrostatic forces acting on the stator can be changed by adjusting the surface area of rear pressure face 52. The surface area of rear pressure face 52 can be altered by varying both the size of stator 30 and recess 46 formed in stator 30.

Fluid channel 54 is located within the boundaries of the top and rear walls of cup 34 and surrounding the top and bottom surfaces, 32a and 32b of rear portion 32 of stator 30. Fluid channel 54 provides the pressurized fluid in the housing direct access to rear pressure face 52. The fluid channel allows high pressure fluid to surround the top and sides of stator 30. In this way, high pressure fluid forces are blocked off between stator 30 and cup skirt 35 and biases stator 30 against rotor 26. Consequently, an increase in the pressure of the pressurized fluid causes an increase in the force acting on rear pressure face 52. Similarly, the hydraulic fluid force imparted on the stator for a given pressure can be varied by changing the surface area of the rear pressure face 52 by changing the diameter of skirt 35 and neighboring parts.

In the preferred embodiment the seal also includes a spring 50 which fits within a recess formed in rear wall 36c of cup recess 36. The spring exerts a static force by indirectly acting against rear pressure face 52 to press stator and rotor sealing faces 38 and 40 into engagement. As shown in FIG. 1, spring 50 presses against a protection washer 51 which is in contact with the rear pressure face 52. The static force exerted by spring 50 rapidly becomes negligible in magnitude (compared to the hydrostatic force) as the seal is subjected to operating conditions.

In accordance with the invention, gap positioning means is provided for producing a gap dependent force to cause the gap between the rotor and stator to stay within a preselected range regardless of the directional rotation of the rotor, thereby providing a bi-directional non-contact seal. As embodied herein, the gap positioning means produces a controlled interface lifting force acting on the sealing faces. The gap positioning means includes a plurality of radial grooves 58 formed in rotor sealing face 38 for fluid communication with the pressurized fluid. The present invention contemplates as an alternative embodiment forming a plurality of radial grooves in stator sealing face 40. The radial grooves, as shown, are symmetrical about a radial line of rotor sealing face 38 and preferably have a curved cross-sectional configuration. However, grooves having different cross section, such as square cross sections, could be used. The plurality of radial grooves are spaced from one another so that a plurality of lands 60 are located therebetween. Radial grooves 58 and lands 60 are preferably of uniform width, respectively. Further, in the preferred embodiment the width of radial grooves 58 is approximately equal to the width of lands 60. Radial grooves 58 preferably have a width within the range of 0.1 to 0.5 inches and have a depth within the range of 200 to 1000 millionths of an inch.

As shown in FIG. 1, radial grooves 58 extend inwardly from the outer periphery of rotor sealing face 38 a distance less than the radial span of rotor sealing face 38. The remaining portion of rotor sealing face 38 provides a sealing dam 62 radially downstream to radial grooves 58. As a result, the radial dam tends to impede the flow of pressurized fluid to the ambient atmosphere and thereby minimize leakage. Preferably, the radial length of radial grooves 58 is larger than the radial length of sealing dam 62. In the preferred configuration sealing dam 62 has a radial length of within the range of at least 40 to 50 thousandths of an inch.

The seal of the present invention represents a seal capable of producing and maintaining a proper preselected gap or space between rotor and stator sealing faces as a result of the net force generated by the closing and opening forces operating on the seal. The seal is specifically configurated to generate self-restoring closing and opening forces capable of producing a predetermined proper gap between the sealing faces.

The closing force acting on the seal is primarily a function the magnitude of pressure acting on the left side of stator 30, although the force provided by spring 50 also tends to push or slide the stator toward the rotor. This spring force, however, is fairly constant, and the magnitude of the spring force becomes insignificant, when the seal is subjected to high pressure. The major variables factored into the net hydrostatic pressure acting on the stator include the operating pressure and the area of rear pressure face 52 against which the pressure acts. The magnitude of the closing pressure force can be varied by altering the inside diameter of the secondary seal 48 together with the diameter of cup skirt 35 thereby either enlarging or decreasing the surface area subjected to hydrostatic forces.

Spring 50 serves to keep the rotor and stator sealing faces 38 and 40 together when the machine is not running. The force produced by spring 50 is very small in comparison to the hydrostatic pressure load. Once the machine is pressurized, the pressure force quickly exceeds the spring force.

The opening force placed on the seal is a function of a variety of variables, including the width and length of radial grooves 58, the cross-sectional geometry of radial grooves 58, the pressure of the pressurized fluid, the speed of shaft 22, the size of the gap between the sealing faces, and fluid viscosity. As described more fully below, even when the sealing faces are in contact, pressurized fluid will fill the grooves and create an opening force at the interface of the grooves and the opposing sealing face. The radial grooves are sized so that, as the pressure increases to operating pressure, the opening or lifting force at the interface of the grooves and the sealing face will open the sealing faces and create a gap. Once a gap is formed between the sealing faces, pressurized fluid will create a gap dependent hydrostatic opening force over the entire area of the sealing interface. As described more fully below, the gap-dependent hydrostatic forces tend to cause the sealing faces to float at operating pressures. In addition, when the stator and rotor rotate relative to one another, hydrodynamic opening forces are developed because of fluid shear between the sealing faces in the vicinity of the radial grooves, as shown in FIGS. 8 and 9. The magnitude of this hydrodynamic force is a function of, inter alia, the radial groove structure of the present invention, the properties of the pressurized fluid, and the size of the space between the rotor and stator. The closing and opening forces are interrelated since the magnitude of the hydrostatic and hydrodynamic forces varies relative to the size of the gap.

Under operating conditions, the seal of the present invention creates the proper gap size by essentially equalizing the counteracting forces operating thereon. In the preferred embodiment, the seal is designed so that the gap size is typically approximately 100 millionths of an inch. As will be described more fully below with reference to FIGS. 5A, 6A, 7A and 9, the hydrostatic and hydrodynamic forces acting at the interface of rotor and stator sealing faces 38 and 40 vary, depending upon the gap size. The hydrodynamic force is highly sensitive or reactive to the particular gap size. Generally, a small gap size results in high hydrodynamic and hydrostatic opening forces while a large gap size results in lower opening forces. Extremely high hydrodynamic forces are developed when the rotor and stator almost touch. The seal of the present invention thus ensures a non-contact seal at operating pressure and speed.

The seal of the present invention is designed so that as pressure becomes significant relative to the load applied by spring 50, a self-restoring hydrostatic balance is achieved whereby stator 30 effectively floats on a fluid film. When the sealing faces are initially at contact and are not sliding relative to one another, the force pressing the stator toward the rotor is the sum of the spring force and the integral of the pressure acting over the rear pressure face 52 of the stator. The force tending to press the stator away from the rotor is the integral of the pressure acting on the contacting sealing faces, at the radial grooves 58. This condition is shown generally in FIG. 5. The seal is designed so that at operating pressure, the opening force at the interface of the sealing faces slightly overcomes the closing force, thereby creating a slight gap between the sealing faces.

Figure 6:
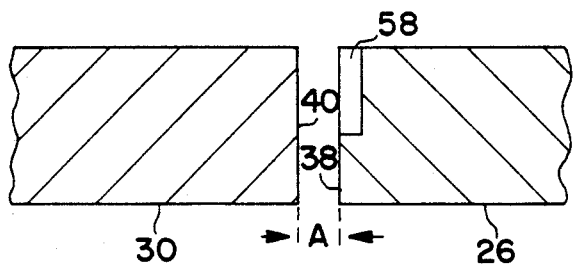
FIG. 6 is a partial cross-sectional view of the stator and rotor separated by a large gap.
Figure 6A:
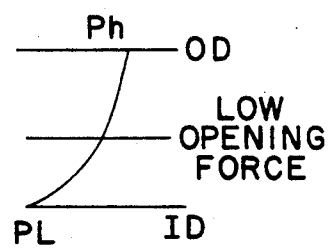
FIG. 6A is a pressure diagram illustrating the hydrostatic pressure distribution on the sealing faces illustrated in FIG. 6.
Figure 7:
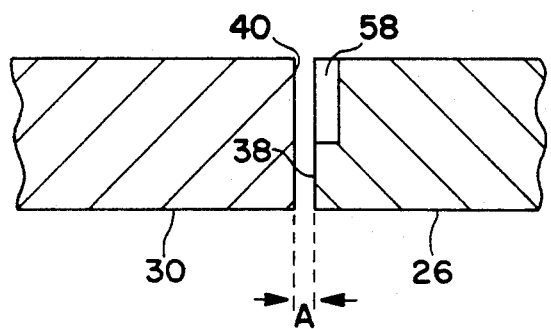
FIG. 7 is a partial cross-sectional view illustrating a stator and rotor separated by a proper gap.
Figure 7A:
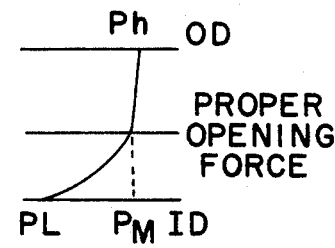
FIG. 7A is a pressure diagram illustrating the hydrostatic pressures distribution on the sealing faces illustrated in FIG. 7.

As shown in FIGS. 6-7A, the pressure distribution profile changes when the gap opens. As depicted in FIG. 6A, the hydrostatic opening force decreases if the gap between the sealing faces becomes too large. At the proper gap size, the hydrostatic opening and closing forces balance and as shown in FIGS. 7 and 7A, the sealing faces float on a fluid film.

When shaft 22 rotates and the rotor and stator are too close together, the hydrodynamic forces generated by the fluid shearing between the sliding surfaces of rotor and stator sealing faces 38 and 40 produce an opening force. Specifically, radial grooves 58 cause fluid to vary its viscous dominated flow in response to the precise geometric configuration thereof. The change in the viscous dominated flow of the fluid causes a circumferential pressure change which in turn alters the gap size. As the gap size increases, the hydrodynamic force descreases, as explained further with reference to pressure profiles depicted in FIG. 9. As a result, if the gap becomes too large, the sealing faces tend to close.

Figure 5:
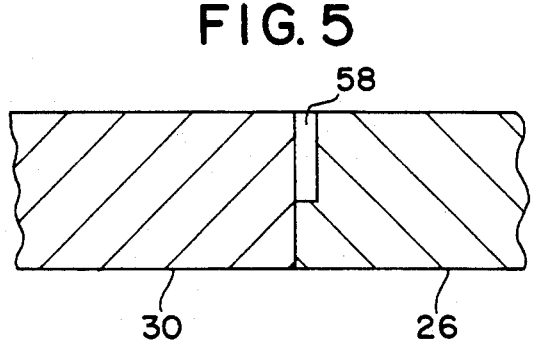
FIG. 5 is a partial cross-sectional view illustrating the sealing surfaces of the stator and rotor at contact.

The hydrostatic and hydrodynamic forces acting upon rotor and stator seal faces 38 and 40 at the radial groove area can be more fully understood by reference to FIGS. 5-7 and FIGS. 8-9, respectively. Regarding FIGS. 5-7 illustrating hydrostatic forces, the hydrostatic opening force can be determined by integrating the pressure distribution over the area. The pressure at any point is a function of among other things, the gap size, the pressure of the fluid, and the geometry of the radial grooves.

Figure 5A:
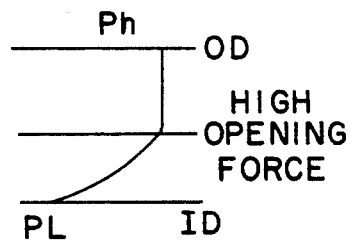
FIG. 5A is a pressure diagram illustrating the hydrostatic pressure distribution upon the sealing faces illustrated in FIG. 5.

FIGS. 5 and 5A illustrate the hydrostatic effects on rotor and stator sealing faces 38 and 40, at the state where rotor 26 and stator 30 are for practical purposes in contact. At this stage, there is no fluid flow from the OD side to the ID side. Thus, the pressure on the sealing faces at the radial groove location is a constant $P_h$, representing the maximum pressure of the fluid. The pressure across the sealing dam beyond the radial groove area and between the sealing faces gradually decreases from $P_h$ to $P_l$, the ambient pressure.

FIGS. 6 and 6A illustrate the hydrostatic effects on rotor and stator sealing faces 38 and 40 having a large gap, large being relative to radial groove depth, between the respective sealing faces. As the gap size becomes large, in contrast to FIG. 5A, the fluid flow becomes insensitive to the presence of the radial grooves resulting in relatively continuous pressure drop over a large area. The pressure profile of FIG. 6A shows a pressure decrease more smooth or continuous from $P_h$ at the outer L perimeter of the respective sealing faces to $P_l$ at the interior perimeter of rotor 26 and stator 30.

FIGS. 7 and 7A illustrate the hydrostatic effects on rotor and stator sealing faces 38 and 40 when the predetermined proper gap of the present invention is formed between the respective sealing faces. As shown, the pressure along the grooves decreases slightly from $P_h$ to $P_m$, and the pressure below the grooves changes more rapidly from $P_m$ to $P_l$.

As high pressure fluid fills the plurality of radial grooves 58, the pressure acts against the sealing faces of the grooves and creates a hydrostatic opening face. To balance the proper hydrostatic opening force which acts on the stator interface, an equivalent and opposite in direction hydrostatic closing force acts on the rear pressure face 52 of stator 30. For a given operating pressure, this closing force is determined by specifying the appropriate diameter for cup skirt 35. This diameter defines the location and size of secondary seal 48 and, hence, the surface area subject to a constant hydrostatic closing force. In general, the hydrostatic pressure force is much larger than the spring force. When the gap becomes large, the hydrostatic interface opening force is small compared to the constant closing force and the gap decreases. When the gap closes, the hydrostatic interface opening force overcomes the closing force. Therefore, a complete hydrostatic self restoring force balance is reached when the seal operates with a proper gap.

FIGS. 8 and 8A show the hydrodynamic forces at the radial groove area of the present invention. In operation, stator sealing face 40 is stationary, while the rotor sealing face 28 rotates or slides relative to stator 30. The fluid located between the sealing faces is dragged in the direction of moving rotor 26. As gaseous fluid goes from the edge to the deeper radially rounded area of the radial groove, the gas film experiences an expansion. As a result, the pressure of the gas drops. The pressure drop, however, is limited by the laws of physics, namely, a pressure drop below absolute zero (negative one atmosphere) is impossible. Once the fluid or gas passes the deepest radial groove area, the fluid is compressed causing a rise in pressure. The pressure rise is dependent upon the speed, the film thickness and the viscosity of the fluid and, in contrast to the pressure drop, is not limited in magnitude. The net opening pressure is larger in magnitude than the ambient or reference pressure because the pressure rise is larger than the pressure drop. This explains why, as shown in FIG. 9, the net opening force created by the grooves increases as the speed of the rotor increases. It has further been found that the net opening force increases as the gap between the faces decreases. This hydrodynamic opening force combines with the hydrostatic opening force when relative sliding motion takes place between the sealing surfaces. This effect further ensures that no face contact will occur between the stator and the rotor.

Figure 11A:
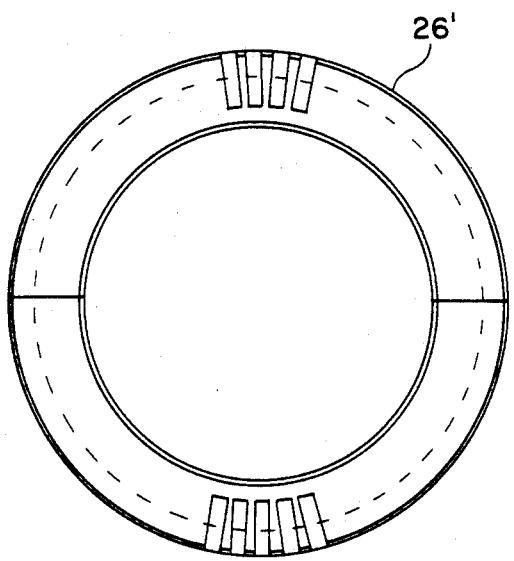
FIG. 11(A) depicts a split rotor according to the invention.
Figure 11B:
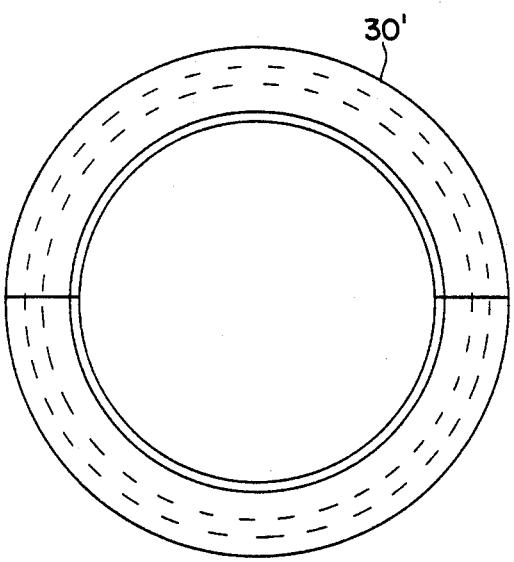
FIG. 11(B) depicts a split stator according to the invention.

FIG. 10 shows a second preferred embodiment of the present invention wherein the seal is split and is capable of high temperature service. The seal of the second embodiment is primarily based upon the previously described principles and elements except for the replacement of elastomers with high temperature resistant materials. Further, the seal of the second embodiment includes segmented stator 30' and rotor 26' which are split for easy around-the-shaft replacement, as shown in FIGS. 11(a) and 11(b). Once stators 30' and rotor 26' are properly positioned, they are held in place by securing means. Preferably, the securing means is a split radial spring 29 and a garter spring 31 for holding the split ceramic rotor and the split carbon stator in position, respectively. Because stator 30' is non-rotating, garter spring 31 does not have to apply high loads to hold the two split stator parts together. However, rotor 26' is subject to high centrifugal forces which tend to separate the split rotor joints. To overcome this centrifugal effect, radial spring 29 is heavily squeezed between rotor carrier 28 and rotor 26'. This applies high radial closing force on the split rotor and prevents its opening. Because radial spring 29 is split, it cannot serve as a seal in the same way static seal 44 is used in the first embodiment (FIG. 1). Rather, sealing between rotor carrier 28 takes place at the flat interface 45 where simple contact prevents the leakage. Similarly, garter spring 33 can hold the non-elastomer segmented seal 48' in position. The design principles and operation of this second embodiment are the same as those of the previously described seal except the rotor and stator are split for easy around-the shaft replacement.

It will be apparent to those skilled in the art that various modifications and variations can be made in the bi-directional, non-contact seal of the present invention and in the construction of this seal without departing from the scope and spirit of the invention.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A bi-directional seal for sealing, from the ambient, a pressurized fluid in the interior of a housing fitted with a rotatable shaft, the seal comprising:
   a rotor fixed to the shaft for rotation with the shaft, said rotor including a first annular sealing face substantially perpendicular to the shaft, the first annular sealing face having an inner and outer diameter;
   a stator axially slidably held relative to the housing for movement toward and away from said rotor, said stator including a second annular sealing face substantially perpendicular to the shaft, the second annular sealing face having an outer and an inner diameter;
   said first and second annular sealing faces being aligned with and opposed to each other, a variable gap between said faces providing a channel for the pressurized fluid to flow toward the ambient;
   means for preventing the rotation of said stator relative to the housing;
   sealing means for substantially preventing the flow of pressurized fluid to the ambient in areas other than across said sealing faces;
   means for biasing said stator and its second annular sealing face toward said rotor and its first annular sealing face; and
   a plurality of radial grooves for producing a gap between said first and second annular sealing faces regardless of the direction of rotation in response to relative rotation between the first and second annular sealing faces, the grooves having a curved shape with respect to a radial cross-section, said radial cross-section having a dimension defining the width of each groove, said groove having a depth, said width being greater than the depth of said groove, the grooves extending a portion of the distance between the inner and outer diameter and the grooves being in fluid communication with the pressurized fluid, the grooves thereby providing a hydrodynamic bi-directional non-contact seal, each groove being isolated from the remaining of said plurality of grooves by a continuous land surface.

2. The bi-directional seal of claim 1 wherein said plurality of radial grooves are spaced from one another so that a plurality of lands separate said plurality of radial grooves.

3. The bi-directional seal of claim 2 wherein said plurality of radial grooves and lands have uniform widths, respectively, and the width of said radial grooves is approximately equal to the width of said lands.

4. The bi-directional seal of claim 1 wherein said radial grooves extend inwardly from the outer periphery of the sealing face in which they are formed.

5. The bi-directional seal of claim 4 wherein the portion of the distance between the inner and the outer diameter of the sealing face over which the grooves do not extend provides a sealing dam.

6. The bi-directional seal of claim 5 wherein the radial length of said radial grooves is larger than the radial length of said sealing dam.

7. The bi-directional seal of claim 5 wherein the radial length of said sealing dams is at least within the range of 40 to 50 thousandths of an inch.

8. The bi-directional seal of claim 1 wherein said radial grooves have a width within the range of 0.1 to 0.5 inches.

9. The bi-directional seal of claim 1 wherein the depth of said radial grooves is within the range of 200 to 1000 millionths of an inch.

10. The bi-directional seal of claim 1 wherein the ratio of the distance between the sealing faces at the ungrooved interface over the distance between the bottom of the radial grooves and the opposite sealing face is within the range of 0.1 to 0.3.

11. The bi-directional seal of claim 10 wherein said gap between said first and second sealing faces in the area of the sealing dam is approximately within the range of 50 to 250 millionths of an inch.

12. The bi-directional seal of claim 10 wherein said gap between said first and second sealing faces in the area of the sealing dam is approximately 100 millionths of an inch.

13. The bi-directional seal of claim 1 wherein said stator biasing- means includes a rear pressure face formed on said stator opposite said second sealing face and a fluid channel providing the pressurized fluid in the housing direct access to said rear pressure face, whereby an increase in the pressure of the pressurized fluid causes an increase in the force pressing against said rear pressure face.

14. The bi-directional seal of claim 1 said stator biasing means includes resilient means for biasing said second sealing face toward said first sealing face.

15. The bi-directional seal of claim 1 wherein said rotor is held by a rotor carrier fixed to the shaft and said stator is held within a cup fixed to said housing.

16. The bi-directional seal of claim 15 wherein said sealing means for substantially preventing pressurized fluid leakage includes a static seal formed between said rotor and said rotor carrier and a second seal formed between said stator and said cup.

17. The bi-directional seal of claim 16 wherein said stator rotation prevention means includes an anti-rotation lug fixed to said cup and slidably received by said stator.

18. A bi-directional seal for sealing, from the ambient, a pressurized fluid in the interior of a housing fitted with a rotatable shaft, the seal comprising:
 a rotor fixed to the shaft for rotation with the shaft, said rotor including a first annular sealing face substantially perpendicular to the shaft, the first annular sealing face having an inner and outer diameter;
 a stator axially slidably held relative to the housing for movement toward and away from said rotor, said stator including a second annular sealing face substantially perpendicular to the shaft and further including a rear pressure face at the end of said stator opposite said second annular sealing face, the second annular sealing face having an outer and an inner diameter;
 said first and second annular sealing faces being aligned with and opposed to each other, a variable gap between said faces providing a channel for the pressurized fluid to flow toward the ambient;
 means for preventing the rotation of said stator relative to the housing;
 sealing means for substantially preventing the flow of pressurized fluid to the ambient in areas other than across said sealing faces;
 a fluid channel providing the pressurized fluid in the housing direct access to said rear pressure face of said stator, whereby the pressurized fluid acts on said rear pressure face and thereby presses said second sealing face of said stator toward engagement with said first sealing face of said rotor; and
 a plurality of radial grooves formed in one of said first and second annular sealing faces for producing a variable force responsive to the rotation of the shaft to cause said gap between the first and second annular sealing faces to stay within a preselected range, the grooves having a curved shape with respect to a radial cross-section, said radial cross-section having a dimension defining the width of each groove, said groove having a depth, said width being greater than the depth of said groove, the grooves extending a portion of the distance between the inner and outer diameter and the grooves being in fluid communication with the pressurized fluid, said radial grooves having a width within the range of 0.1 to 0.5 inches and a depth within the range of 100 to 1000 millionths of an inch, each groove being isolated form the remaining of said plurality of grooves by a continuous land surface.

19. The bi-directional seal of claim 18 wherein said plurality of radial grooves are spaced from one another so that a plurality of lands separate said plurality of radial grooves.

20. The bi-directional seal of claim 19 wherein the width of said radial grooves is approximately equal to the width of said lands.

21. The bi-directional seal of claim 18 wherein the portion of the distance between the inner and the outer diameter of the sealing face over which the grooves do not extend provides an annular sealing dam.

22. The bi-directional seal of claim 21 wherein the radial length of said radial grooves is larger than the radial length of said sealing dam.

23. The bi-directional seal of claim 21 wherein the radial length of said sealing dam is at least within the range of 40 to 50 thousandths of an inch.

24. The bi-directional seal of claim 18 wherein the ratio of the distance between the sealing faces at the ungrooved interface over the distance between the bottom of the radial grooves and the opposite sealing face is within the range of 0.0.1 to 0.3.

25. The bi-directional seal of claim 18 wherein said space between said sealing faces is kept at approximately 100 millionths of an inch.

26. The bi-directional seal of claim 18 wherein both said stator and said rotor are split and wherein the seal includes means for holding said split rotor and stator in place, said holding means capable of providing holding at high temperature.

27. The bi-directional seal of claim 18 wherein said rear pressure face of said stator and said plurality of radial grooves are sized so that the pressurized fluid acting at the surfaces thereof will at operating pressure create hydrostatic forces that will form said gap between the sealing faces and allow the gapped sealing faces to float at a hydrostatic equilibrium.

* * * * *

UNITED STATES PATENT AND TRADEMARK OFFICE
CERTIFICATE OF CORRECTION

PATENT NO.  :  5,143,384

DATED       :  September 1, 1992

INVENTOR(S) :  Abraham Lipschitz

It is certified that error appears in the above-identified patent and that said Letters Patent is hereby corrected as shown below:

Claim 13, column 11, line 2, after "biasing" delete "-".

Claim 18, column 20, line 15, "form" should read --from--.

Claim 24, column 12, line 40, "0.0.1" should read --0.1--.

Signed and Sealed this

Seventh Day of September, 1993

Attest:

BRUCE LEHMAN

*Attesting Officer*    *Commissioner of Patents and Trademarks*